(12) United States Patent
Liang

(10) Patent No.: US 7,503,709 B2
(45) Date of Patent: Mar. 17, 2009

(54) HOLDER STRUCTURE OF NETWORK CAMERA

(76) Inventor: Hui-Hu Liang, No.3, Pao Chi Lane, Chung Ya Tsun, Siu Shul, Hsiang, Changhua Hsien (TW)

( * ) Notice: Subject to any disclaimer, the term of this patent is extended or adjusted under 35 U.S.C. 154(b) by 376 days.

(21) Appl. No.: 11/373,316

(22) Filed: Mar. 13, 2006

(65) Prior Publication Data

US 2007/0212057 A1    Sep. 13, 2007

(51) Int. Cl.
*G03B 17/00* (2006.01)
(52) U.S. Cl. .................. 396/428; 348/373; 348/825
(58) Field of Classification Search .............. 396/428; 348/373, 825; D16/237, 242
See application file for complete search history.

(56) References Cited

U.S. PATENT DOCUMENTS

| 6,773,172 B1* | 8/2004 | Johnson et al. ............ 396/428 |
| 2005/0068461 A1* | 3/2005 | Lin et al. ..................... 348/375 |

\* cited by examiner

*Primary Examiner*—W. B. Perkey
*Assistant Examiner*—Warren K Fenwick
(74) *Attorney, Agent, or Firm*—Troxell Law Office, PLLC

(57) ABSTRACT

A network camera holder includes an universal coupling for fixing a network camera and a clinch. The clinch is configured to hook a thin frame and, also, can reverse outward on a pivot in order to grip a thicker frame. The clinch can also be spread out to place the holder directly on a flat surface.

5 Claims, 4 Drawing Sheets

HOLDER STRUCTURE OF NETWORK CAMERA

BACKGROUND OF THE INVENTION

1. Field of the Invention

This invention relates to a holding structure of a network camera, wherein a fixture fixed at one side of a holder pivots to control gripping thickness.

2. Description of the Prior Art

Direct network communication via video chat and conferencing using a network camera and the supporting computer software, is the most common communication method applied by current corporations. However, when conducting network video communication the positioning of a network camera is an important consideration. Usually, a network camera is positioned on a desktop or monitor of a computer by gripping and locking. However, it may be limited by shape and thickness due to the distance between the gaps of clips and locks. However, computer screens are increasingly produced in unique shapes and with geometrical curves. Therefore, the old positioning method for network cameras can not be applied to these variable products, so further improvement is needed.

SUMMARY OF THE INVENTION

I. Problem to Solve

Prior art network camera holders are inconvenient to assemble due to the fixed size of the clinching gap, so, such structure is not practical.

Due to great changes and innovations in the appearance of computers it is very difficult to apply only one fixing method to place or position a network camera, which may limit its application.

II. Solutions a. Fixture producing counterforce by a compression spring is fixed at one side of the holder of this invention, and another side has a pivoting clinch which grips using both the block side of clinch, and the hook side of the clinch after this clinch reverses outward to spread out, so that it can grip onto objects of different thickness.

b. This invention can open the clinch to allow the fixture to be placed on a table, so, its application is convenient.

c. This invention includes a universal coupling to fix the network camera so as to adjust the angle of this network camera and expand the field of vision.

d. This invention can clip onto a LCD or Notebook computer and automatically adjust its griping according to different thickness, and it can even directly be placed on a thick CRT screen.

DETAILED DESCRIPTION OF THE PREFERRED EMBODIMENTS

Figure 1:
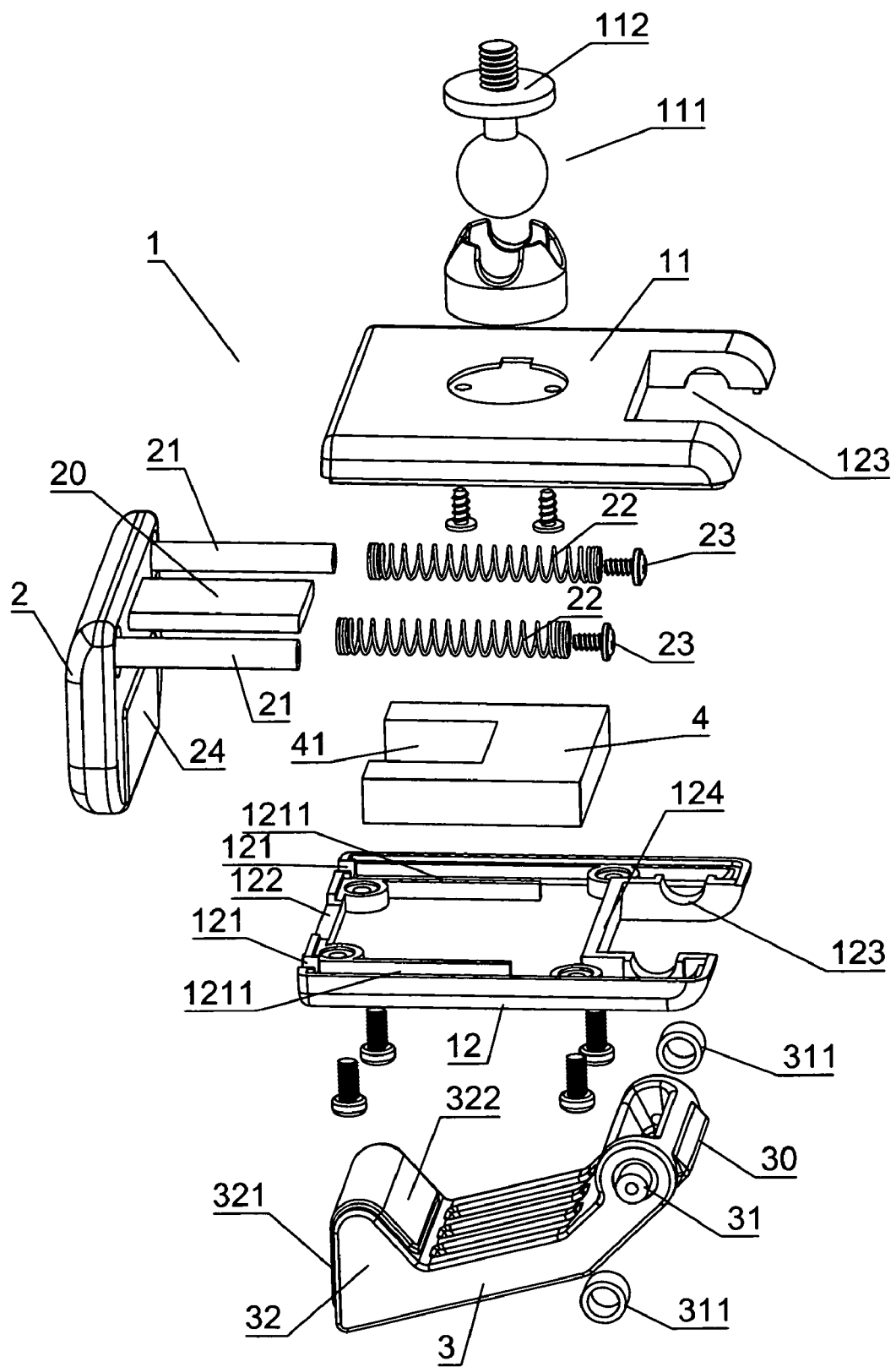
FIG. 1 is the three-dimensional exploded view of this invention.
Figure 2:
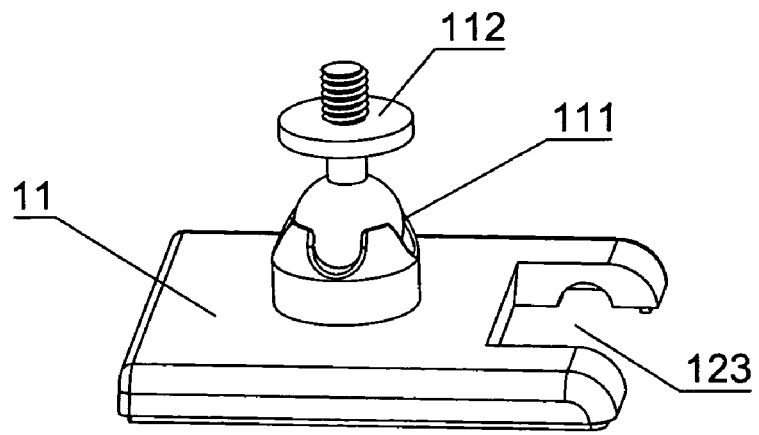
FIG. 2 is the three-dimensional exploded combination view of an upper cover and universal coupling of this invention.

Please refer to FIG. 1 and FIG. 2. Holder 1 is composed of upper and lower cover 11, 12. Fixture 2 is assembled at one side and clinch 3 is pivoted at its opposite side, wherein universal coupling 111 is fixed onto upper cover 11, fixing seat 112 on this universal coupling 111 locks the network camera so the field of vision can be adjusted. Pivot seat 123 is then fixed at one side to pivot clinch 3.

Please refer to FIG. 1. Two ends of lower cover 12 includes set holes 121, runner 1211 is set respectively at two sides, and spacing hole 122 is made between two holes 121. Pivot seat 123 is set opposite to hole 121.

Figure 3:
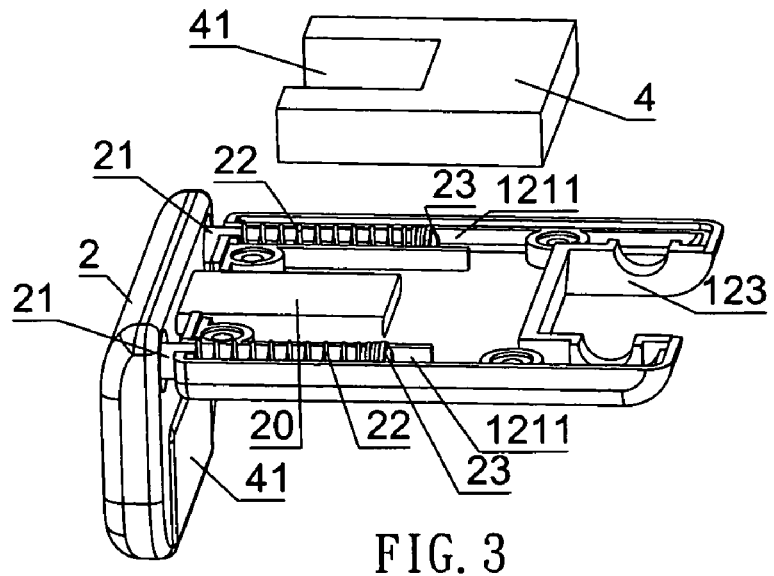
FIG. 3 is the three-dimensional combination view of a lower cover and fixture of this invention.
Figure 6:
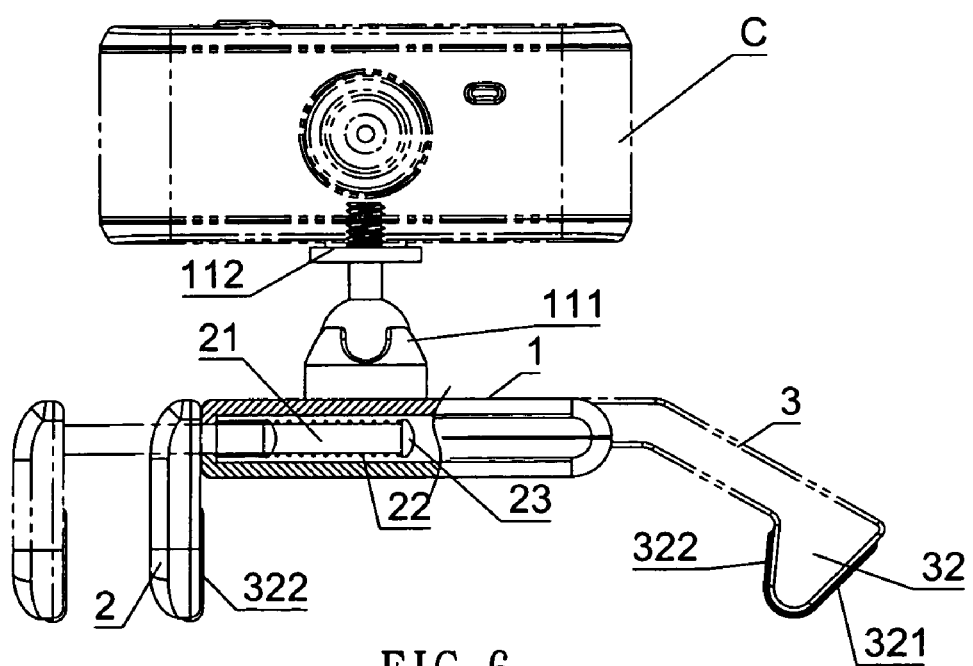
FIG. 6 is the mutual movement sketch map between the fixture and compression spring of this invention.

Please refer to FIGS. 1, 3 and 6. Pull rod 21 is respectively fixed at two sides of fixture 2, spacing fixture 20 is set between pull rods 21, wherein one piece of compression spring 22 is respectively placed onto pull rod 21 to lock it at its end with screw 23 so as to block compression spring 22. Pull rod 21 of fixture 2 and compression spring 22 are put into this runner 1211, and one end of compression spring 22 leans against an internal edge of the above said hole 121. Screw 23 leans against another end, so that, as fixture 2 is pulled out to press compression spring 22 to produce counterforce, the gripping side 24 of fixture 2 can impose gripping force on the object.

Please refer to FIG. 1 and FIG. 3. A ⊓-shaped heavy block 4 is assembled between two runners 1211, and spacing board 20 of fixture 2 is embedded into gap 41 so as to prevent displacement when fixture 2 moves forward and backward. Therefore, holder 1 is more stable.

Please refer to FIG. 1, FIG. 4, FIG. 5 and FIG. 7. Pivot 31 is respectively fixed at two sides of one end of clinch 3, and block 30 is assembled at a proper position between the two pivots 31 and may be embedded into block wall 124 of pivot seat 123 so as to limit the spreading out of clinch 3 when pivot 31 strides over pivot seat 123 of the above said lower cover 12. Hook 32 with block side 321 and hook side 322 is set at one end of pivot 31 under lower cover, so that block side 321 is used to grip with gripping side 24 of the fixture 2, and hook side 322 is used to grip with gripping side 24 of the fixture 2 as the clinch 3 is pivoted about the axis of pivot 31.

Figure 4:
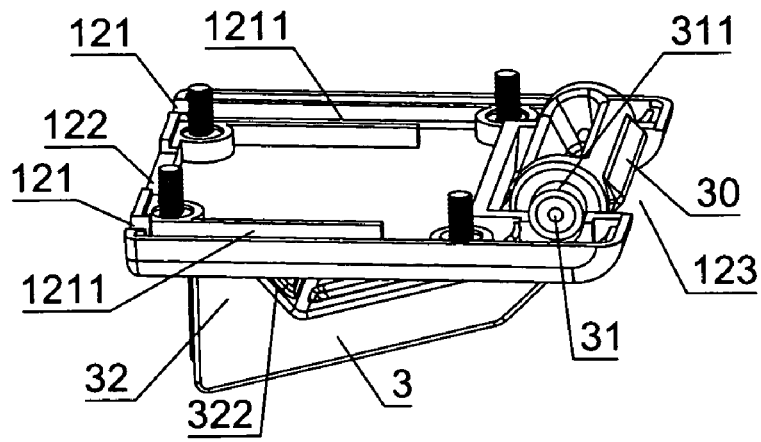
FIG. 4 is the three-dimensional combination view of a lower cover and clinch of this invention.
Figure 5:
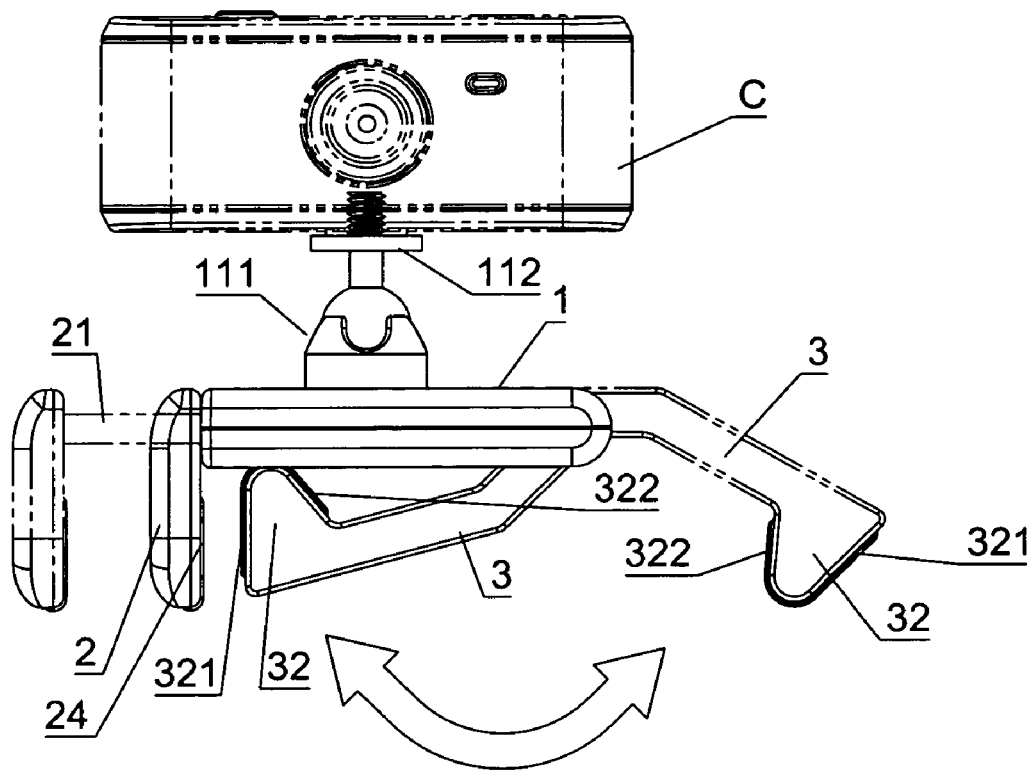
FIG. 5 is the movement sketch map of this invention.

Please refer to FIG. 1 and FIG. 4. Pivot 31 can cover one piece of the soft sleeve 311, which may produce a proper binding force on soft sleeve 311 when closing upper and lower cover 11, 12. Pivot 31 thereby produces resistance so that clinch 3 can be positioned properly in any position while avoiding any shaking in adjustment accordingly.

Figure 8:
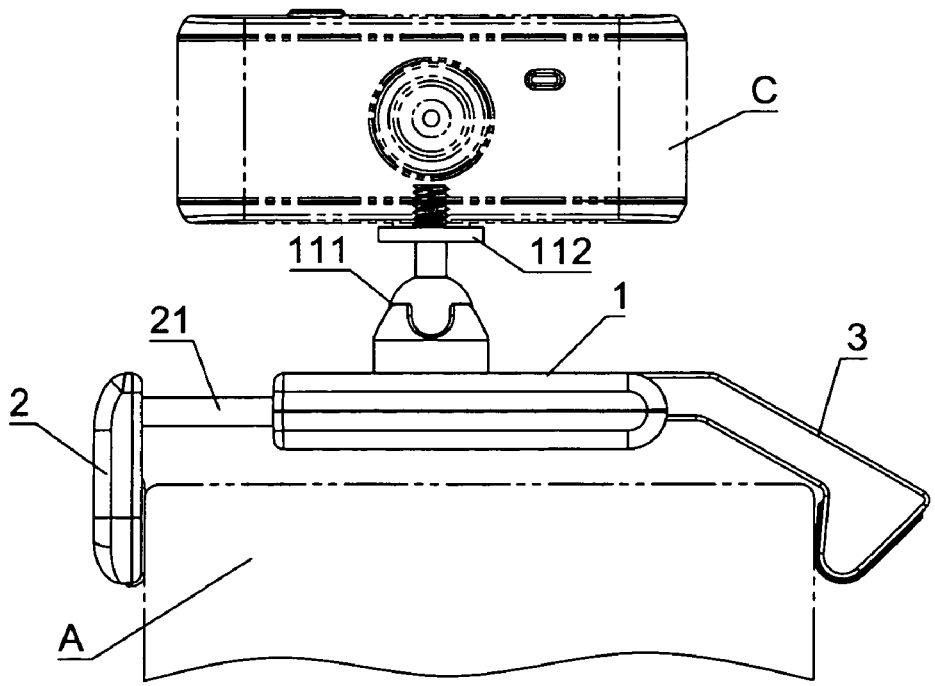
FIG. 8 is another embodiment drawing of this invention.

Please refer to FIG. 1, FIG. 6 and FIG. 8. Fixture 2 of holder 1 applies block side 321 of clinch 3 to lean against an object A according to its thickness. Meanwhile, pull rod 21 presses compression spring 22 so as to produce a counterforce, and gripping side 24 of fixture 2 and block side 321 of clinch 3 grip object A. Hook 32 of clinch 3 is then used to support holder 1 so that it can be positioned onto object A, and universal coupling 111 is fixed at holder 1 to allow the adjustment of the angle of the network camera C so as to expand the field of vision accordingly.

Figure 7:
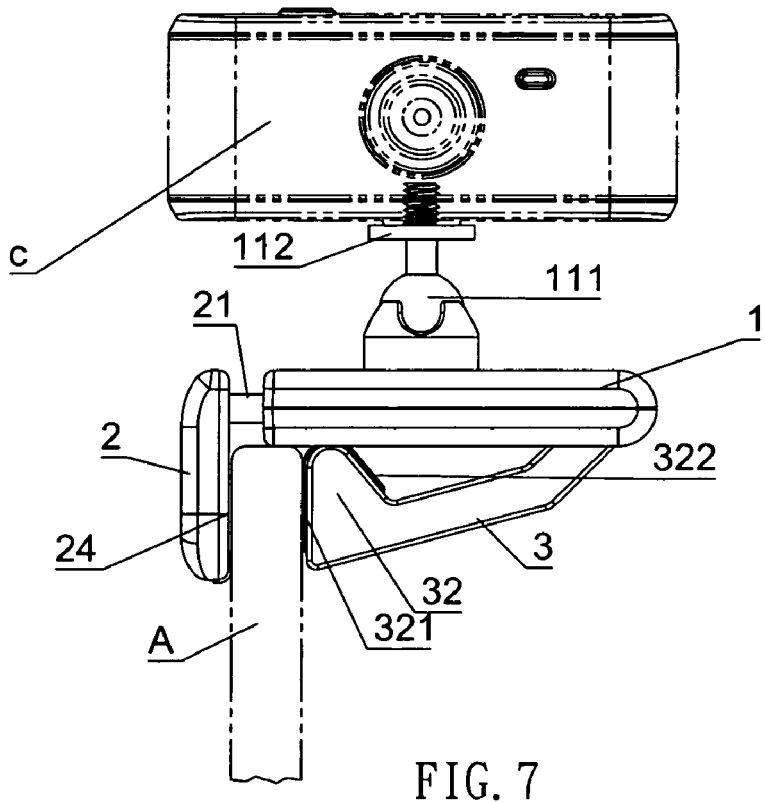
FIG. 7 is the embodiment drawing of this invention.

Please refer to FIG. 7. Clinch 3 can reverse so that the hook side 322 of hook 32 strides over object A, and the gripping side 24 of fixture 2 and hook side 322 of hook 32 grips object A based on the pulling of fixture 2, so that holder 1 is stably fixed on object A.

Please refer to FIG. 7 and FIG. 8. The clinch 3 provides support to holder 1, and the above said fixture 2 adjusts the thickness according to the gripped object A so that it is applicable to objects of different thickness. Furthermore, as clinch 3 reserves to spread out, it can be directly placed on a plane (such as table) using fixture 2 and hook 32 of clinch 3, and the possible applications of this invention are thereby increased accordingly (shown as FIG. 6).

What is claimed is:

1. A holder structure for holding a network camera, comprising:

an upper and lower cover combining to form a cover, a pivot seat and a block wall are set at one end of the lower cover;

a network camera mount fixed on an upper surface of the upper cover;

a fixture having two pull rods at one end, a spacing board is located between the two pull rods, the two pull rods and the spacing board extending into holes in one end of the cover, a gripping side located at another end of the fixture;

compression springs covering the two pull rods with runners inside the cover accepting a combination of the two pull rods and the compression springs, the compression springs being held on the two pull rods by stops on each end of the two pull rods;

a clinch comprising:

two pivots at one end of the clinch, the two pivots engaging with the pivot seat;

a block is placed between the two pivots, the block being embedded into a block wall of the pivot seat so as limit the spreading out of the clinch;

a hook is set at another end of the cinch with one side of the hook being a block side and another side of the hook being a hook side, the block side gripping a relatively thinner object when the cinch is pivoted inwards towards the fixture and the hook side gripping a relatively thicker object when the cinch is pivoted outwards away from the fixture, the pull rods increasingly compressing the compression spring as the fixture is moved farther away from the cover so as to apply a gripping counterforce to the gripping side of the fixture with respect to the hook.

2. The holder structure of claim 1, wherein a universal coupling is affixed to the upper cover, a camera fixing seat is located on the universal coupling.

3. The holder structure of claim 1, wherein a soft sleeve is covered onto the pivots to absorb vibrations.

4. The holder structure of claim 1, further comprising a heavy block located in another runner inside the cover.

5. The holder structure of claim 4, wherein the heavy block includes a gap.

\* \* \* \* \*